(12) United States Patent
Amano et al.

(10) Patent No.: US 7,045,183 B2
(45) Date of Patent: May 16, 2006

(54) EASY-TO-OPEN TUBULAR SEALED CASING

(75) Inventors: Hirozo Amano, Kasugai (JP); Toru Abe, Chikushino (JP); Keiichi Hayashi, Toyonaka (JP); Hirotsugu Fukumori, Yokohama (JP)

(73) Assignee: Japan Patent Management Co., Ltd., Tokyo (JP)

( * ) Notice: Subject to any disclaimer, the term of this patent is extended or adjusted under 35 U.S.C. 154(b) by 556 days.

(21) Appl. No.: 09/901,874

(22) Filed: Jul. 9, 2001

(65) Prior Publication Data

US 2002/0102375 A1 Aug. 1, 2002

(30) Foreign Application Priority Data

Jan. 26, 2001 (JP) ........................................ 2001-018764

(51) Int. Cl.
*B65D 33/24* (2006.01)

(52) U.S. Cl. .................... 428/35.2; 428/35.7; 428/347; 428/349

(58) Field of Classification Search ............... 428/35.2, 428/35.7, 347, 349, 476.9, 36.7
See application file for complete search history.

(56) References Cited

U.S. PATENT DOCUMENTS 4,399,839 A * 8/1983 Hutschenreuter et al. 138/118.1
5,459,978 A * 10/1995 Weiss et al. ................... 53/425
5,860,744 A * 1/1999 Schulz ........................ 383/210
6,238,788 B1 * 5/2001 Bradt .......................... 428/349

FOREIGN PATENT DOCUMENTS

EP 0282 773 A1 * 9/1988

\* cited by examiner

*Primary Examiner*—Sandra M. Nolan-Rayford
(74) *Attorney, Agent, or Firm*—McGlew and Tuttle, P.C.

(57) ABSTRACT

The ease of opening of a tubular casing is facilitated based on a plastic film comprising three or more layers. The tubular sealed casing (1) for packaging the contents therein is based on a composite plastic film formed into a tubular form by bending the base film into a circular form, overlaying two edges of the bent base film, and heat-sealing the overlaid section so that a not heat-sealed section (8) will be left in an edge section of an upper film when the two edges thereof are overlaid on each other. The casing base film (2) is a composite plastic film comprising three or more layers. In this casing, the peel strength between the outer layer (5) and intermediate layer film (3) is set to a lower level as compared to the peel strength between the inner layer film (4) and intermediate layer film (3). Because of this feature, disruption (12) of the outer layer film (5) from the intermediate film (3) occurs easily, when open the casing in the heat-sealed section (7), and further the outer layer film (5) is peeled (13) from the intermediate film (3), so that the casing can easily be opened.

19 Claims, 3 Drawing Sheets

EASY-TO-OPEN TUBULAR SEALED CASING

FIELD OF THE INVENTION

The present invention relates to improvements in easily opening tubular sealed casing technology, and more particularly to such technology in which the casing has three or more layers of composite plastic film.

BACKGROUND OF THE INVENTION

Monolayer plastic films based on a vinyliden chloride film have been used as a casing for processed meat and fish foods, dairy products such as cheese and butter as well as for confectionaries such as jelly. This casing is produced by forming a plastic film into a tubular form so that top and rear surface of the film will be overlaid on each other along the length direction. The overlaid portion is sealed in a manner similar to an envelope being sealed. A heat seal section (a lug section) will be left, with the two edges thereof bound. A metal wire may be used for binding ends or the sections may be sealed by means of an ordinary sealing method.

When opening this casing, there are some difficulties such as cutting a portion of the film with such a tool as a knife and peeling the film off from the section. To overcome this difficulty in opening the casing, there have been proposed various methods to improve the ease of opening the casing. The proposed methods include, for instance, the method in which a strip film stronger than the base film is fusion-bonded to a portion of the base film or the sealed section and the base film is broken by pulling the strip film. Another method involves a V-shaped notch or an I-shaped notch provided as an unsealing means in the portion of the base film not heat-sealed yet and the base film is torn from the notch. Another method involves a number of flaws intentionally provided in a section not heat-sealed yet and the base film is torn from the section.

A trend, in the field of casing film for particular applications, is the consideration given as to a customer's demands for non-chloride-based plastic films. This demand for non-chloride-based plastic films will increase in the future. The casing based on this non-chloride-based plastic film is used in the same way as the vinyliden chloride film described above. However, the capabilities as to function, as a gas barrier and a heat seal are not as required using a non-chloride-based film only. It is therefore generally considered that the mono layer plastic film can not satisfy most needs. The possibility of developing a composite film using the non-chloride film as a component thereof has been investigated. For the reasons as described above, the opening means available for the vinyliden chloride monolayer film casing as described above is insufficient for giving the adaptability to be easily opened to this casing based on the non-chloride-based film.

The above-described technology for easily opening a casing can be employed for the vinyliden chloride film itself because the film is adapted to be easily torn. However, when a composite plastic film is used in place of the monolayer vinyliden chloride film, resistance of the composite plastic film to tearing is high, and it is difficult to open a casing by tearing the film itself.

As described above, the technology for easily opening a casing based on the composite plastic film has not been established.

SUMMARY AND OBJECTS OF THE INVENTION

The present invention was made in the light of the circumstances as described above, and it is an object of the present invention to give a tubular sealed casing using a composite plastic film heat-sealed like in a mailing envelope the adaptability to be easily opened without depending on the I-shaped or V-shaped notch conventionally used for giving the adaptability to be easily opened.

According to the invention, an easy-to-open tubular sealed casing for packaging a content therein based on a plastic film is formed into a tubular form by bending a base film and overlaying two edges of the base film and heat-sealing the overlaid section so that a not heat-sealed section will be left along an edge of the upper film. The base film is a composite plastic film comprising three more layers and the peel strength between the outer layer film, that becomes an outer surface when the composite plastic film is formed into a circular form, and the intermediate layer film, that becomes an intermediate layer is set to a lower level as compared to the peel strength between the inner layer film and the intermediate layer film.

The peel strength between the outer layer film and the intermediate layer film is advantageously set to a range from 10 to 2000 g/15 mm. An opening means (device to facilitate opening) may be provided in the heat-sealed section along an edge thereof. The opening means may be a V-shaped notch, an I-shaped notch, or a flaw.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
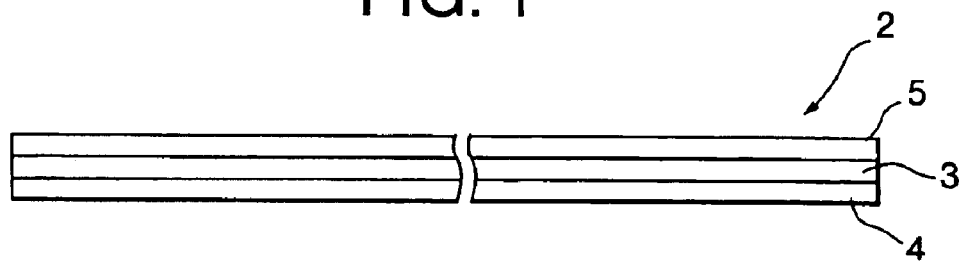
FIG. 1 is an explanatory view for a composite plastic film (base film) used in a casing according to the present invention.

Referring to the drawings in particular, FIG. 1 shows a cross-sectional structure of a base film used in a casing according to the present invention. This base film 2 comprises three film layers; an intermediate layer film 3, an inner layer film 4, and an outer layer film 5, all of which are made from a non-chloride-based film respectively. Further the inner layer film 4 and outer layer film 5 are films each adapted to be heat-sealed, and the intermediate layer film 3 is a film having the capability of functioning as a gas barrier or a UV ray absorber.

The peel strength between the outer layer film 5 and the intermediate layer film 3 is set to a level lower than the peel strength between the intermediate film 3 and the inner layer film 4.

Figure 2:
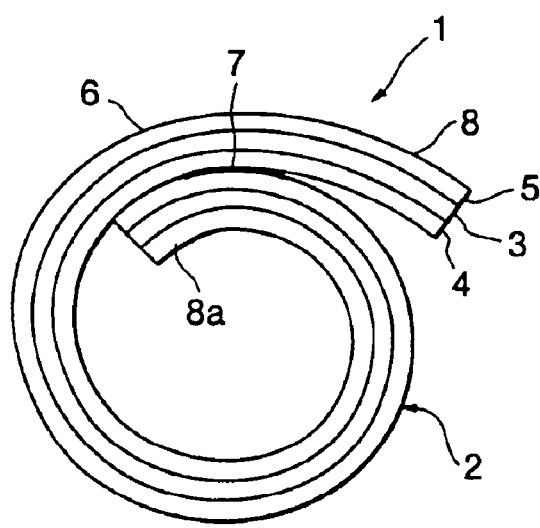
FIG. 2 is an explanatory view showing the state in which the base film is bent to form a tubular body.

This three-layered base film 2 is formed into a tubular casing 1 by bending the base film 2 with the two edges thereof overlaid on each other as shown in FIG. 2, heat-sealing the overlaid section 6 with a constant width in the vertical direction to form a heat-sealed section 7, and leaving sections not heat-sealed yet 8, 8a at inner and outer edges of this heat-sealed section 7.

Figure 3:
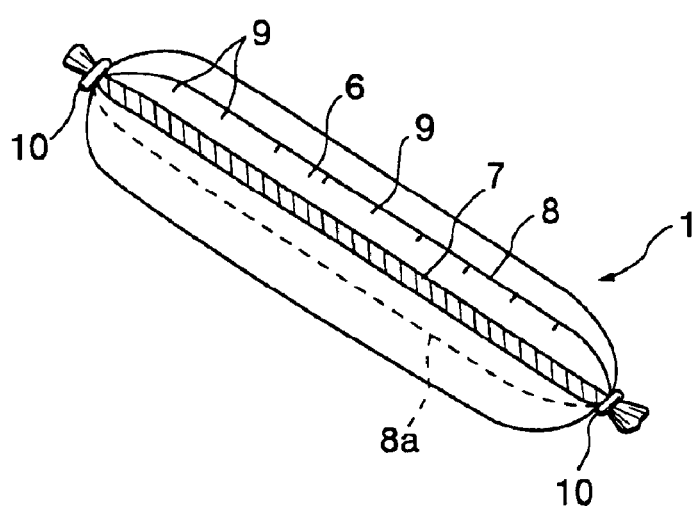
FIG. 3 is an explanatory view showing the state in which a piece of sausage is sealed with the casing according to the present invention.

FIG. 3 shows the state where a casing with a content placed therein has been sealed by binding the two edges thereof with a metal wire 10. The two edge sections may be sealed by heat-sealing, so that the sealing means in the present invention is not limited to the metal wire 10.

In the sealed casing 1 above, I-shaped notches 9 each functioning as an opening means are provided in the not heat-sealed section 8 at a prespecified space therebetween, and the casing 1 is opened from this I-shaped notches 9.

The V-notches or flaws conventionally used for this purpose may be used as an opening means in place of the I-shaped notch, and this is no limitation over the means in this invention.

Further only one notch or flaw may be provided as the opening means, but also a plurality of notches or flaws may be provided so that the casing may be opened from any of the notched or flaws.

When the casing 1 based on the composite film is to be opened, with the technology for easily opening a casing realized by only provided a plurality of I- or V-shaped notched or flaws in the not heat-sealed section 8 as described in relation to the conventional technology, the adaptability to be torn is poor, and the casing can not easily be opened as described above.

The casing can not easily be opened because, even if tearing is started from the section with notches or flaws provided therein, the composite plastic film itself can not easily be torn like the conventional type of monolayer vinyliden chloride film and the seal strength of the heat-sealed section 7 is high.

Figure 4:
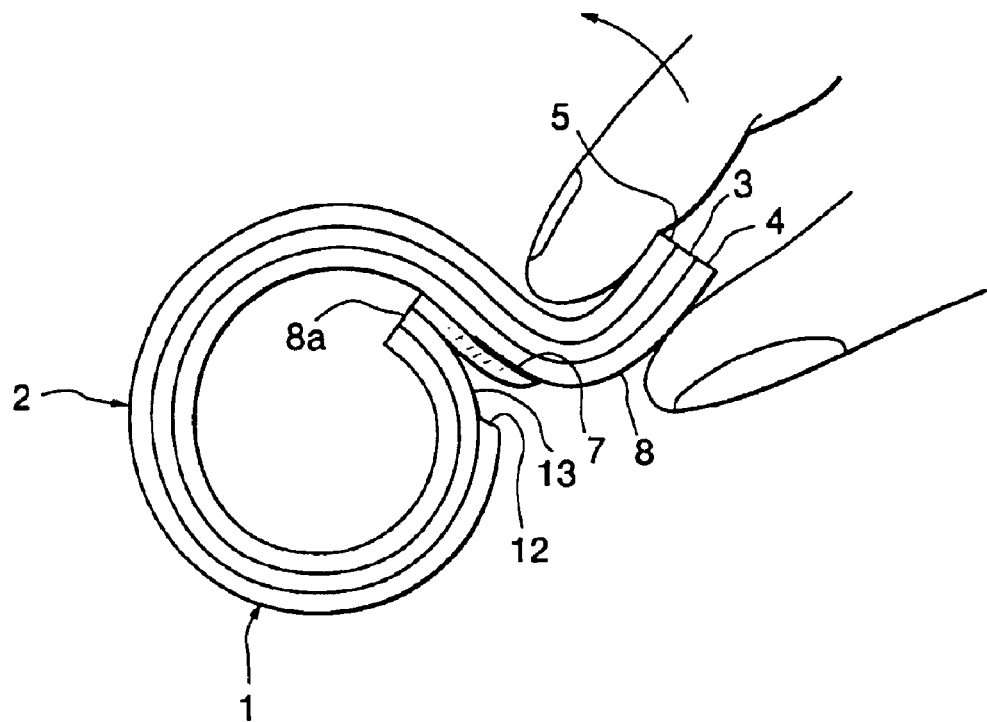
FIG. 4 is an explanatory view showing the state where a sealed casing is being opened by picking the not-sealed portion thereof with fingers.
Figure 5:
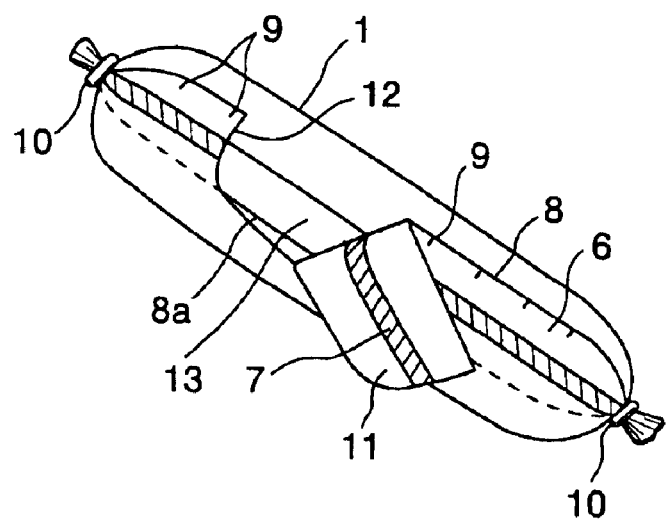
FIG. 5 is an explanatory view showing the sealed casing has been partially opened.
Figure 6:
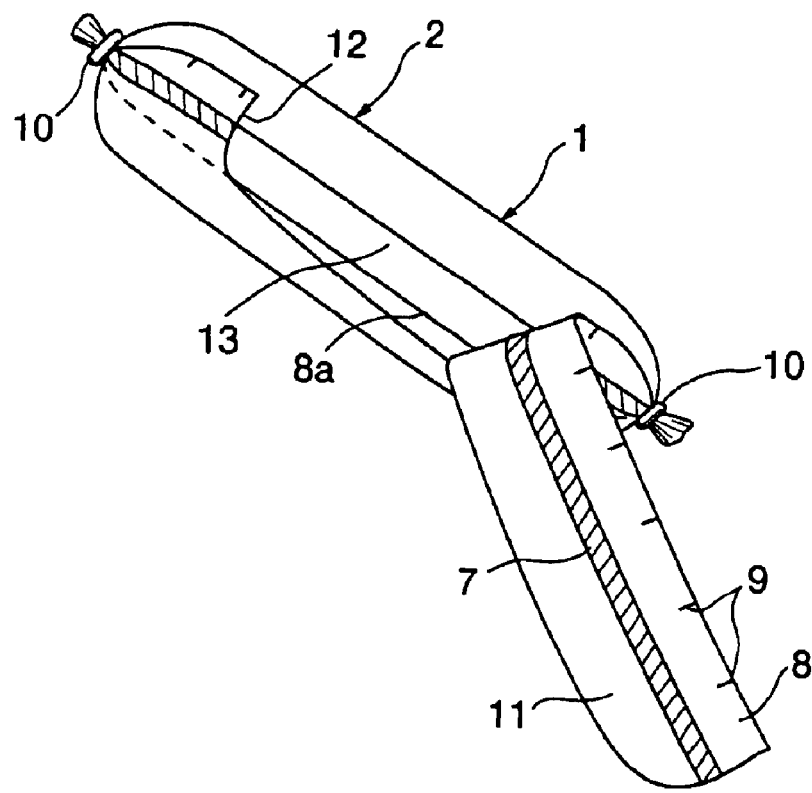
FIG. 6 is an explanatory view showing the state where the casing has been substantially opened.

To overcome the problems, the present inventors concluded based on a result of extended studies that the adaptability of a casing to be easily opened can not be realized only by providing notches or flaws in the not heat-sealed section, and based on this recognition the inventors set the peel strength between the outer layer film 5 and intermediate layer film 3 of the based film 2 comprising three or more layers to a lower level as compared to the peel strength between the inner layer film 4 and intermediate film 3, and also set the operating peel strength to a range from 10 to 2000 g/15 mm. As a result, after tearing is started from the I-notches 9 in the not heat-sealed section 8, when an opening lug 11 is pulled as shown in FIG. 5 and FIG. 6, the outer layer film 5 is broken and cut at the heat-sealed section 7 and the outer layer film 5 is peeled off from the internal layer film 3, so that the casing can easily be opened. This feature can clearly be understood from the cross-sectional view shown in FIG. 4, and with this feature, disruption 12 of the outer layer film 5 occurs at an edge section of the heat-sealed section 7 when the casing 1 is opened, and then peeling 13 from the intermediate layer film 3 occurs, which causes a section up to the not heat-sealed section 8a inside the overlaid section to be peeled off, and this peeling mechanism is quite inventive.

In the base film 2 as a composite plastic film used in the present invention, it is essential because of the necessity of heat seal 7 for the overlaid section 6 that both the inner layer film 4 and outer layer film 5 are plastic films which can be heat-sealed, and there is no limitation over the materials for forming the composite film so long as it can be used as a composite film for the intermediate film 3 (for functioning, for instance, as a gas barrier) to satisfy the requirements of the contents to be placed in the casing (to keep freshness, for instance).

The peel strength between the outer layer film 5 and intermediate layer film 3 can easily be controlled to a lower level than the peel strength between other layers by selecting processing conditions for binding between the outer layer film 5 and intermediate layer film 3 and/or components for the two film layers, and there is no limitation over the method.

Further the methods of providing one or a plurality of notches or flaws at an edge of the not heat-sealed section 8 include, but not limited to the method in which one or a plurality of notches, namely one or a plurality of I or V-shaped notches are provided in the transverse direction along an edge line of the not-heat-sealed section 8 in the auto-packaging step, and the method in which a number of flaws are provided in the transverse direction in the not heat-sealed section 8, namely the method in which a number of flaws are provided at prespecified sections over the width of a metallic roll over which a film passes in the film processing step performed before the film is formed into a casing with a tool having many blade-like projections on the periphery, and any opening start method may be employed for the purpose of this invention, and there is no specific restriction over this opening means.

EXAMPLE

A composite plastic film was manufactured by using a commercially available the not-extended polypropyrene 15μ as the inner layer film 4, a commercially available extended nylon film 20μ as the intermediate layer film 3, and a commercially available not extended polypropyrene film 15μ and also by setting the inter-layer peel strength between the outer layer film 5 and intermediate layer film 3 to 200 g/15 mm by selecting an appropriate adhesive for adhesion between the outer layer film 5 and intermediate layer film 3 and an adhesive for adhesion between the inner layer 4 and intermediate layer film 3 so that the inter-layer peel strength between the inner layer film 4 and intermediate layer film 3 is set to 500 g/15 mm.

Then a piece of fish meal sausage was packed with the film described above by using a vertically postured casing filler/ packager, and the I-shaped notches 9 were provided for making it easier to open the casing in the not heat-sealed section 8 in the overlaid section 6 with both edges of the casing 1 bonded with the metal wire 10, and thus the tubular sealed casing 1 was completed (Refer to FIG. 3).

Then, the experiment was performed to check ease in opening the case from the I-shaped notches 9 in the casing 1 as the opening start position. In this experiment, when the not heat-sealed section 8 was pulled (FIG. 4), disruption 12 of the outer layer film 5 from an edge section of the heat-sealed section 7 occurred and the section with low inter-layer peel strength up to the inside not heat-sealed section 8a between the outer layer film 5 and intermediate layer film 3 was peeled off 13, so that the casing could easily be opened.

Control

Figure 7:
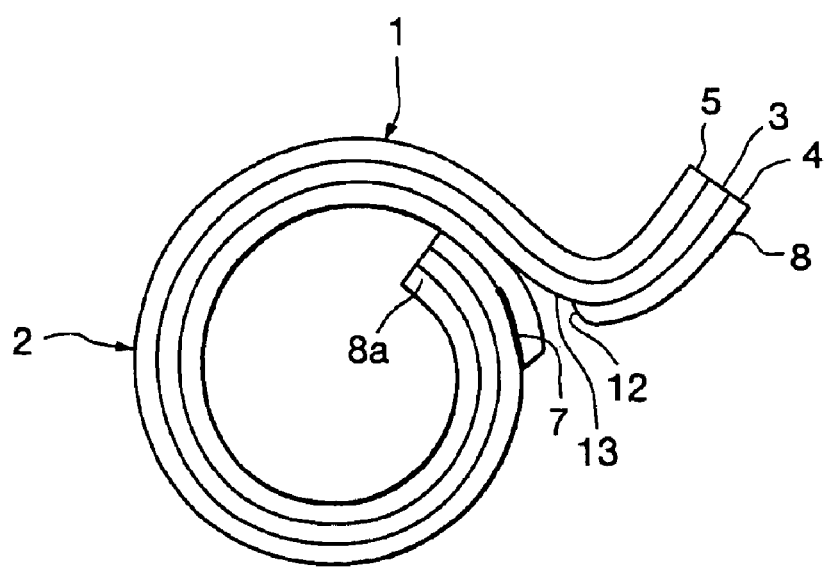
FIG. 7 is an explanatory view showing the situation where a casing as a control is being opened.

FIG. 7 shows a peeling phenomenon in the case where the peel strength between the inner layer film 4 and the intermediate layer film 3 was set to 300 g/15 mm and the peel strength between the outer layer film 5 and the intermediate layer film 3 to 600 g/15 mm, and in this case disruption 12 and peeling 13 occur between the intermediate layer film 3 and inner layer film 4, so that the casing 1 can not be opened.

It should be noted that, although the content in the casing in the example is a piece of fish sausage, any content may be packed in this casing 1, and there is no specific restriction over the content as described above.

As described above, with the conventional technology for easily opening a casing having been applied to the tubular sealed casing based on vinyliden chloride film heat-sealed like in a mailing envelope using a composite plastic film for packing a content therein, the casing can not easily be opened, but with the present invention, the casing can be opened quite easily.

When disposed by burning or by any other method, the monolayer vinyliden chloride film causes the problem of environmental contamination by generation of dioxin, but when the composite plastic film based on a non-chlorine based film is used, such environmental contamination does not occur, and casing for food products compatible with our environment can be provided.

While specific embodiments of the invention have been shown and described in detail to illustrate the application of the principles of the invention, it will be understood that the invention may be embodied otherwise without departing from such principles.

What is claimed is:

1. An easy-to-open tubular sealed casing for packaging a content therein, the casing comprising:
    a base film comprising a composite plastic film with at least three film layers including an outer layer film which forms an outer surface when the composite plastic film is formed into a tubular form, an intermediate layer film which forms an intermediate layer and an inner layer film, said composite plastic film being formed into a tubular form by bending said base film, overlaying two edges of said base film; and
    a heat seal section formed by heat-sealing the overlaid section to heat seal together a portion of the outer layer film to a portion of the inner layer film so that a not heat-sealed section will be left along an edge of the film, with a notch provided man edge of said not-sealed section, a peel strength between said outer layer film and said intermediate layer film being set to a lower level as compared to a peel strength between said inner layer film and said intermediate layer film, whereby a pulling of said not-sealed section adjacent to said notch causes said outer layer film to be disrupted and then peeled from said intermediate film layer starting adjacent to said heat sealed section to open casing.

2. The easy-to-open tubular sealed casing according to claim 1, wherein the peel strength between the outer layer film and the intermediate layer film is set to a range from 10 to 2000 g/15 mm.

3. An easy-to-open tubular sealed casing for packaging a content therein, the casing comprising:
    a base composite plastic film comprising an outer layer film, an inner layer film and an intermediate layer film between said outer layer film and said inner layer film, said composite plastic film being formed into a tubular form by bending said base film and overlaying two edges of said base film; and
    a heat seal formed by heat-sealing the overlaid section to form a heat sealed section between said outer layer film and said inner layer film and a not heat-scaled section outward of said heat sealed section, a peel strength between said outer layer film and said intermediate layer film being set to a lower level as compared to a peel strength between said inner layer film and said intermediate layer film, whereby to open the casing a pulling of said not-sealed section causes said outer layer film to be disrupted adjacent to said heat sealed section and then peeled from said intermediate film layer.

4. The easy-to-open tubular sealed casing according to claim 3, wherein the peel strength between the outer layer film and the intermediate layer film is set to a range from 10 to 2000 g/15 mm.

5. The easy-to-open tubular sealed casing according to claim 3, further comprising a cut into an edge of said not heat-scaled section of said base composite plastic film, said cut extending toward said heat sealed section.

6. The easy-to-open tubular sealed casing according to claim 4, further comprising a cut into an edge of said not teat-sealed section of said base composite plastic film, said cut extending toward said heat sealed section.

7. The easy-to-open tubular sealed casing according to claim 6, wherein said opening facilitating structures include a V-shaped notch, an I-shaped notch, or a flaw in the film.

8. A tubular scaled casing comprising:
    an intermediate layer with first and second sides;
    a first layer arranged on said first side of said intermediate layer, said first layer being connected to said intermediate layer at a first peel strength;
    a second layer arranged on said second side of said intermediate layer, said second layer being connected to said intermediate layer at a second peel strength, said second peel strength being greater than said first peel strength; and
    a heat seal formed by heat-sealing two portions of said layers to form a heat sealed section of said layers and a not heat-scaled section outward of said heat sealed section, whereby to open the casing a pulling of said not-sealed section causes said first layer to be disrupted adjacent to said heat sealed section and then peeled from said intermediate layer.

9. A casing in accordance with claim 8, wherein:
    said first, second and intermediate layers are formed into a tubular form by curving said layers and overlapping two portions of said layers, with said heat sealed section having said first layer of one portion contact said second layer of the other said portion.

10. A casing according to claim 9, wherein:
    an opening facilitating structure is arranged at one of said edges of said layers.

11. A casing according to claim 10, wherein:
    said opening facilitating structure is one of a V-shaped notch, an I-shaped notch, or a flaw in said layers.

12. A casing in accordance with claim 8, wherein:
    said first and second layers are heat sealed to each other to form said heat seal.

13. A casing in accordance with claim 8, wherein:
    said intermediate layer is a gas barrier.

14. A casing in accordance with claim 8, wherein:
    said intermediate layer is a UV ray absorber.

15. A casing in accordance with claim 8, wherein:
    said first and second layers are formed of polypropylene.

16. A casing in accordance with claim 8, wherein:

said intermediate layer is formed of nylon.

17. A casing in accordance with claim 15, wherein:

said intermediate layer is formed of nylon.

18. A casing in accordance with claim 17, wherein:

said polypropylene of said first and second layers are not extended;

said nylon of said intermediate layer is extended.

19. A casing in accordance with claim 8, wherein:

said first and second layers are formed from substantially identical materials;

said first and second layers are differently connected to said intermediate layer to have said second peel strength be greater than said first peel strength.

* * * * *